US009080271B2

(12) United States Patent
Ryoo et al.

(10) Patent No.: US 9,080,271 B2
(45) Date of Patent: Jul. 14, 2015

(54) CLOTHES TREATING APPARATUS WITH LIQUID SUPPLY UNIT

(75) Inventors: Byeong-Jo Ryoo, Gyeongsangnam-Do (KR); Seung-Phyo Ahn, Gyeongsangnam-Do (KR); Sung-Ho Song, Gyeongsangnam-Do (KR); Yang-Hwan Kim, Gyeongsangnam-Do (KR); Dong-Hyun Kim, Gyeongsangnam-Do (KR); Yang-Ho Kim, Gyeongsangnam-Do (KR); Yoon-Seob Eom, Gyeongsangnam-Do (KR); Jae-Hyuk Wee, Gyeongsangnam-Do (KR); Jeong-Yun Kim, Gyeongsangnam-Do (KR); Sang-Ik Lee, Gyeongsangnam-Do (KR)

(73) Assignee: LG ELECTRONICS INC., Seoul (KR)

( * ) Notice: Subject to any disclaimer, the term of this patent is extended or adjusted under 35 U.S.C. 154(b) by 1555 days.

(21) Appl. No.: 12/672,239

(22) PCT Filed: Aug. 1, 2008

(86) PCT No.: PCT/KR2008/004492
§ 371 (c)(1),
(2), (4) Date: Mar. 31, 2011

(87) PCT Pub. No.: WO2009/020309
PCT Pub. Date: Feb. 12, 2009

(65) Prior Publication Data
US 2011/0185511 A1    Aug. 4, 2011

(30) Foreign Application Priority Data

Aug. 6, 2007  (KR) .................. 10-2007-0078726

(51) Int. Cl.
*D06F 39/08* (2006.01)
*D06F 29/00* (2006.01)

(52) U.S. Cl.
CPC ............. *D06F 29/00* (2013.01); *D06F 29/005* (2013.01); *D06F 39/088* (2013.01); *Y02B 40/56* (2013.01)

(58) Field of Classification Search
CPC ....... D06F 29/00; D06F 29/005; D06F 39/00; D06F 39/005; D06F 39/006; D06F 39/083; D06F 39/085; D06F 39/088; D06F 58/28; D06F 58/24; D06F 2202/08; D06F 2204/08; D06F 2202/082; D06F 2202/086; D06F 2202/088; D06F 2206/00
USPC ............ 68/20, 3 R, 13 R, 19, 12.16, 12.21, 9; 8/137; 34/596
See application file for complete search history.

(56) References Cited

U.S. PATENT DOCUMENTS 3,139,744 A * 7/1964 Alstyne et al. ..................... 68/20
3,406,413 A * 10/1968 Ridley ............................... 8/158
2005/0223755 A1* 10/2005 Hong et al. .................. 68/12.14

FOREIGN PATENT DOCUMENTS

EP     1029961 A2 *  8/2000  .............. D06F 29/00
EP     1548173 A1 *  6/2005  .............. D06F 39/00

(Continued)

*Primary Examiner* — Michael Barr
*Assistant Examiner* — Irina Graf
(74) *Attorney, Agent, or Firm* — Birch, Stewart, Kolasch & Birch, LLP

(57) ABSTRACT

A washing-drying system and a water supply controlling method, the system comprising: a first main body configured to perform washing; a second main body installed at one side of the first main body and configured to perform drying; water supply lines formed both in the first and second main bodies; and a water supply controlling unit configured to control an open or closed state or a connected or disconnected state of the water supply lines, wherein warm water and cold water respectively supplied from warm water source and cold water source both existing outside the system flow through the second main body to thusly be supplied into the first main body, whereby wastewater having high temperature generated after drying or dehumidifying laundry can be used for warm water washing, so as to save water required for the warm washing, and also to reduce energy consumed to generate warm water.

15 Claims, 4 Drawing Sheets

(56) References Cited

FOREIGN PATENT DOCUMENTS

| | | | |
|---|---|---|---|
| JP | 6-277398 | A | 10/1994 |
| KR | 10-2002-0057114 | A | 7/2002 |
| KR | 10-2003-0084066 | A | 11/2003 |
| KR | 10-0715997 | B1 | 5/2007 |

* cited by examiner

| FIRST MAIN BODY | SECOND MAIN BODY | VALVE | | | | | MODE |
|---|---|---|---|---|---|---|---|
| | | FIRST MAIN BODY | | SECOND MAIN BODY | | | |
| | | 1 | 2 | 3 | 4 | 5 | |
| ○ | × | ○ | ● | ● | ○ | ● | COLD WATER WASHING |
| | | ● | ○ | ● | ○ | ● | WARM WATER WASHING |
| × | ○ | ○ | ● | ○ | ○● | ●○ | |
| ○ | ○ | ○ | ● | ○ | ○● | ●○ | COLD WATER WASHING |
| | | ○ | ○ | ○ | ○● | ●○ | WARM WATER WASHING |
| × | × | ● | ● | ● | ○ | ● | |

○ : OPEN   ● : CLOSED
▨ : PRE-DETERMINED
▦ : CONTROLLED BY FIRST MAIN BODY
▰ : CONTROLLED BY TEMPERATURE SENSING UNIT

CLOTHES TREATING APPARATUS WITH LIQUID SUPPLY UNIT

TECHNICAL FIELD

The present invention relates to a washing-drying system, and particularly, to a water supply line configuration allowing a connection between a first main body performing washing and a second main body performing drying such that a high temperature of wastewater, which is discharged after performing drying or dehumidifying laundry can be used to perform warm water washing, and a controlling method thereof.

BACKGROUND ART

In general, a washing-drying system is implemented with washer and dryer to serve as a pair. Also, such washing-drying system can be configured as a combined dryer and washer.

The washing-drying system is one of home appliances, which is put on a market as a pair allowing both washing and drying to be conveniently done at one place and is installed in the same space.

For the installation of the washing-drying system, due to the spatial limitation for its installation, a washer and a dryer were typically arranged up and down. A cold water line connected into the dryer diverged from a cold water line connected into the washer. Accordingly, the washer and the dryer worked independently.

A dryer is provided with a cold water line for the dehumidification or drying, and a drain line for discharging wastewater (e.g., cooling water) generated via a heat-exchange with humid air to the exterior, while a washer is directly connected both to a warm water source and a cold water source and discharges wastewater generated after washing through a drain pump installed in the washer.

DISCLOSURE OF INVENTION

Technical Problem

In particular, in case of a washing-drying system using a ductless dryer having a water-cooled dehumidifying module, as considering the feature of the ductless dryer, cooling water or wastewater used for the dehumidification is clean warm water over a temperature of 40° C.

Here, since the washer and the dryer of the washing-drying system independently operate, it is impossible to recycle the cooling water of the ductless dryer as water for the washer. This results in increasing an amount of water used in the entire washing-drying system.

In addition, cold water supplied from the cold water source is divided to be used respectively in the washer and in the dryer. Accordingly, upon simultaneously driving the two machines, the amount of cold water supplied into the dryer decreases, thereby degrading a dehumidifying efficiency of the dryer.

Furthermore, since water (cold water) supplied into the washer is partially used in the dryer, the amount of water required for washing decreases, which increased time taken by washing, causing an increase in power consumption.

Technical Solution

Therefore, in order to solve the problems of the related art, an object of the present invention is to provide a washing-drying system including: a first main body configured to perform washing; a second main body installed at one side of the first main body and configured to perform drying; water supply lines formed either in the first main body or in the second main body; and a water supply controlling unit configured to control an open/closed or connected/disconnected state of the water supply lines.

Here, the water supply controlling unit includes: a second controller formed at the second main body and configured to selectively connect external water supply sources to the first main body; and a first controller formed in the first main body and operating in cooperation with the second controller.

As such, the first controller formed in the first main body is configured to be in cooperation with the second controller formed in the second main body, such that water supplied both to the first and second main bodies can be controlled by the cooperation between the first and second main bodies, other than being controlled independently by each of the first and second main bodies.

The second controller includes: a third valve configured to control a flow of cold water supplied from a cold water source of the water supply sources to a heat-exchanger, the heat-exchanger being installed in the second body to dehumidify laundry; a fourth valve configured to control a flow of warm water supplied into the first main body from a warm water source of the water supply sources; and a fifth valve configured to allow cooling water (wastewater) from the heat-exchanger to be discharged to the exterior or to be supplied into the first main body. The first controller includes: a first valve configured to control a flow of cold water supplied from the cold water source via the second main body; and a second valve configured to allow one of cooling water supplied via the fifth valve and warm water supplied via the fourth valve to be selectively supplied into the first main body.

The first and second controllers can be implemented as valves for controlling passages, so as to enable a simple control of water supply.

Also, the third or fifth valve is switched on in cooperation with a turn-on of the second main body or switched off in cooperation with a turn-off of the second main body, and the fourth valve is switched off in cooperation with the turn-off of the second main body or switched off in cooperation with the turn-on of the second main body. That is, the control of cold water or warm water supplied into the first main body is determined according to whether or not the second main body is activated, whereby the first main body can use water supply or drainage from the second body.

The second main body can be provided with a temperature sensing unit configured to measure a temperature of cooling water discharged from the heat-exchanger. Here, the cooling water is supplied into the first main body only when the temperature measured by the temperature sensing unit is higher than a reference temperature. In case of performing both washing and drying, since the temperature of cooling water drained at the beginning of a drying operation is low, instead of performing warm water washing using the cooling water having the low temperature, it is advantageous to directly use warm water supplied from the external warm water source for washing.

The water supply lines include: a cold water supply line configured to connect the cold water source to the heat-exchanger; a washing side cold water feeding line diverging from the cold water line to be connected to the first main body; a warm water supply line configured to connect the warm water source to the first main body; a cooling water line configured to connect the heat-exchanger to the first main body; a drying side drain line diverging from the cooling water line to be connected to the outside of the second main body; and a washing side drain line connected to the outside of the first main body.

In more detail, the water supply lines preferably include: a cold water supply line configured to connect the cold water source to the third valve; a washing side cold water feeding line configured to connect the third valve to the second valve and supply cold water to the first main body; a drying side cold water feeding line configured to connect the third valve to the heat-exchanger; a cooling water line configured to connect the heat exchanger to the fifth valve; a cooling water feeding line configured to connect the second valve to the fifth valve; a drying side drain line connected to the fifth valve to discharge the cooling water to the exterior; a warm water supply line configured to connect the warm water source to the fourth valve; and a washing side warm water feeding line configured to connect the fourth valve to the second valve and supply warm water from the warm water source directly into the first main body.

The second main body is a ductless dryer, including: a casing; a drum rotatably installed in the casing; a hot air supplying unit configured to supply hot air into the drum; a heat-exchanger configured to remove moisture contained in humid air discharged from the drum; and an exhaust unit configured to exhaust air passed through the heat-exchanger to the casing. The first main body performs warm water washing using the cooling water discharged out of the second main body.

That is, since the second main body is water-cooled dryer having the heat-exchanger, cooling water having a high temperature is generated during its operation, and such cooling water is supplied to the first main body, whereby warm water to be used for the warm water washing can be saved. Here, the cooling water generated from the humid air of the objects to be dried is collected in a separate tub to be then thrown out by a customer.

In another aspect of the present invention, there is provided a method for controlling water supply in a washing-drying system, comprising: supplying power both to first main body and to second main body; regulating a third valve to supply cold water supplied from a cold water source to a heat-exchanger of the second main body; sensing a temperature of cooling water generated after the cold water is passed through the heat-exchanger; and regulating a fifth valve to supply the cooling water into the first main body when the temperature of cooling water sensed at the temperature sensing step is higher than a reference temperature, whereby the first main body can perform warm water washing.

Here, the first valve or fourth valve is switched off.

The supplying of the cooling water into the first main body is performed when a certain time elapses after the second main body is activated, wherein before the certain time elapses, warm water is supplied from the warm water source to the first main body by switching the fourth valve on. This is for performing warm water washing directly using warm water from the warm water source at the beginning of drying because the temperature of cooling water generated at the beginning of the drying is not warm enough to perform the warm water washing.

Also, in another aspect of the present invention, there is provided a washing-drying system having a first main body for performing washing and a second main body for performing drying, in which warm water and cold water supplied respectively from a warm water source and a cold water source existing outside the system are supplied into the first main body via the second main body.

Here, the cold water supplied into the first main body diverges from the cold water supply line for supplying cold water from the cold water source into the second main body, so as to allow such water to be supplied to the first main body.

Also, warm water supplied into the first main body is either cooling water drained out of the second main body or warm water passed through the second main body to be then supplied into the first main body. Here, the warm water supplied into the first main body is selected, according to a temperature of cooling water, from cooling water drained out of the second main body or warm water supplied into the first main body after being passed through the second main body.

As described above, the present invention provides the water supply lines formed between the first main body for washing and the second main body for drying and the water supply controlling unit for controlling connection/disconnection or opening/closing of the water supply lines, whereby cooling water generated after drying or dehumidifying objects to be dried can be used for washing, resulting in saving water required for the washing.

Also, the present invention allows warm water washing to be performed using cooling water which is wastewater discharged (thrown out) after drying, so as to enable a reduction of energy required to generate warm water.

In addition, a sufficient amount of cold water supplied to the second main body for the drying can be ensured so as to increase a cooling efficiency and decrease time taken for the washing.

The present invention also allows the warm water washing using cooling water when the cooling water discharged from a dryer is higher than a certain temperature, thereby reducing user s burden of setting temperature for warm water washing or the like.

The present invention also provides the water supply controlling unit useable even in a single dryer, so as to increase availability of the dryer configuring the washing-drying system.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE FOR CARRYING OUT THE INVENTION

Description will now be given in detail of configuration and operations in accordance with one embodiment of the present invention, with reference to the accompanying drawings.

Figure 1:
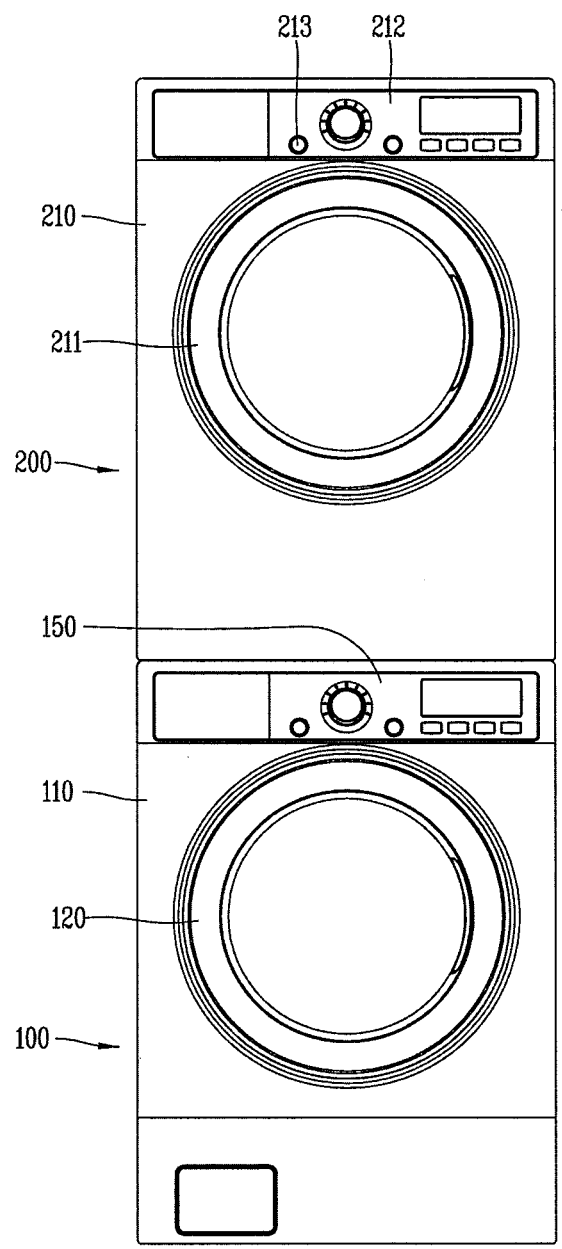
FIG. 1 is a front view of a washing-drying system in accordance with one embodiment of the present invention.

FIG. 1 is a front view of a washing-drying system in accordance with one embodiment of the present invention.

As shown in FIG. 1, a washing-drying system according to one embodiment of the present invention may include a first main body 100 disposed at a lower portion for performing washing, and a second main body 200 installed on the first main body 100 for performing drying.

Here, the positions of the first and second bodies 100 and 200 can be changed. Also, the second main body 200 may be a washer combined with a dryer or a washing-drying machine for performing a refreshing function such as preventing wrinkles on clothes or the like.

The first main body 100 may include a first casing 110 configuring an outer appearance, a first drum (not shown) installed inside the first casing 110, a first door 120 for putting laundry into the first drum, and a first control panel 150 disposed at the first casing 110 for setting an operation course.

The second main body 200 may include a second casing 210 configuring an outer appearance, a second drum (not shown) installed inside the second casing 210, a second door 211 for opening/closing the second drum to collect laundry to be dried, and a second control panel 212 for setting a drying operation. An on/off switch 213 is also provided for the second main body 200. The configuration of the second main body 200 will be described in detail as follows.

Figure 2:
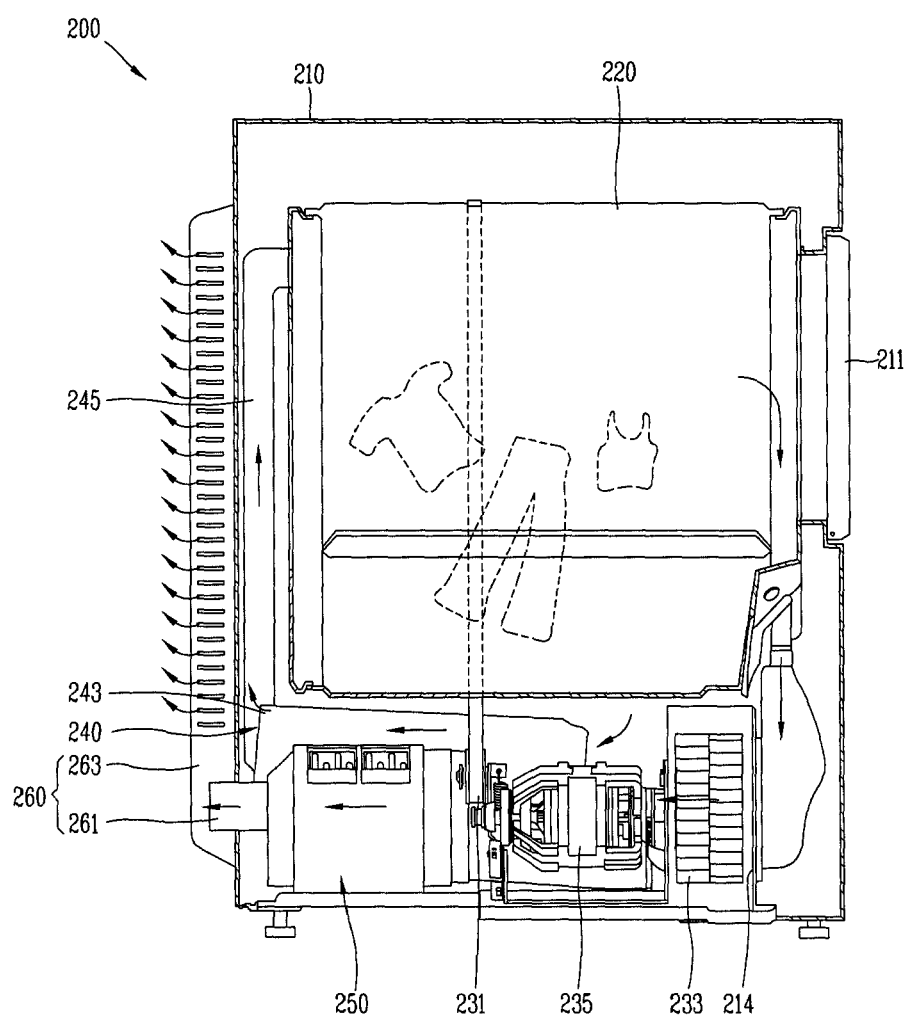
FIG. 2 is a schematic view showing a configuration of a second main body employed in the washing-drying system of FIG. 1 for performing drying.

FIG. 2 is a schematic view showing the configuration of the second main body used in the washing-drying system of FIG. 1 for performing drying. As shown in FIG. 2, the second main body 200 includes a second casing 210, a second drum 220 rotatably installed in the casing 210, a hot air supplying unit 240 for blowing hot air into the second drum 220, a heat exchanger 250 for eliminating moisture contained in the air exhausted out of the second drum 220, and an exhaust unit 260 for exhausting the moisture-eliminated air blown out of the heat exchanger 250 to the rear side of the second casing 210.

A second door 211 for putting clothes into the second drum 220 is installed at a front face of the second casing 210. The second casing 210 includes therein a belt 231 for rotating the second drum 220, a fan 233 installed in a circulating duct 214 for providing a blowing force of air inside a ductless dryer, namely, in the second main body 200, and a motor 235 for providing a driving force to the belt 231 and the fan 233. Here, a plurality of motors 235 may be configured so as to supply driving forces to each of the belt 231 and the fan 233.

The circulating duct 214 may be provided with a filter (not shown) for filtering up lint, such as fuzz or pieces of thread, contained in the hot and humid air blown out of the second drum 220.

The hot air supplying unit 240 includes a valve (not shown) for supplying or blocking gas, a gas burner (not shown) ignited after mixing gas exhausted from the valve with air supplied from the exterior to thusly generate hot air, and a hot air supplying duct 245 for connecting the gas burner to the second drum 220 so as to supply the generated hot air to the second drum 220.

The hot air supplying unit 240 may be provided with a flame rod extending to an edge of flame so as to indirectly determine a generated amount of carbon monoxide (CO) according to a numerical value of a detected flame current.

The heat exchanger 250 consists of a pin and a tube. The heat exchanger serves to cool hot humid air out of the second drum 220 by low temperature water in a manner of heat-exchange between air and water, thereby converting such hot humid air into a dried state. Here, the low temperature water is cold water supplied from an external cold water source. Such cold water becomes cooling water of temperature being raised to some degree after being heat-exchanged with hot humid air.

An inlet of the heat exchanger 250 is connected to the second drum 220 via the circulating duct 214, and an outlet thereof is connected to an exhaust duct 261.

The pin of the heat exchanger 250 is formed of a metallic thin film with a great conductivity. A plurality of such thin films are stacked on one another with fine intervals so as to perpendicularly come in contact with hot humid air such that the hot humid air can pass therethrough.

Water of low temperature (e.g., 22° C.) circulates in the tube of the heat exchanger 250 and reciprocally passes through the pin of the heat exchanger 250. Both side ends of the tube are connected to a water hose (not shown) for supplying and recollecting low temperature water. A water tray (not shown) for collecting cooling water generated and dropped during a cooling process is installed below the heat exchanger 250.

The exhaust unit 260 includes an exhaust duct 261 having one end connected to the heat exchanger 250 and another end exposed to a rear side of the casing 210, and a back cover 263 covering the exposed exhaust duct 261 to allow air exhausted to be discharged to a side surface.

In the second main body 200 configured as mentioned to perform drying or dehumidifying of laundry, humid air absorbed during the drying process is heat-exchanged in the heat exchanger 250 to be converted into cooling water. During the conversion into the cooling water, cold water supplied into the heat exchanger 250 may typically become cooling water having a water temperature of greater than 40° C. Here, the cooling water is usually clean water. Thus, such cooling water is supplied into the first main body 100 to be used for warm water washing in the first main body 100.

Cold water from an external cold water source is also supplied into the heat exchanger 250. For this, water supply lines may be formed to supply warm water or cold water from an external source and supply such water between the first main body 100 and the second main body 200. In addition, a water supply controlling unit is formed to control the opening/closing of the water supply lines, which will now be described in detail.

Figure 3:
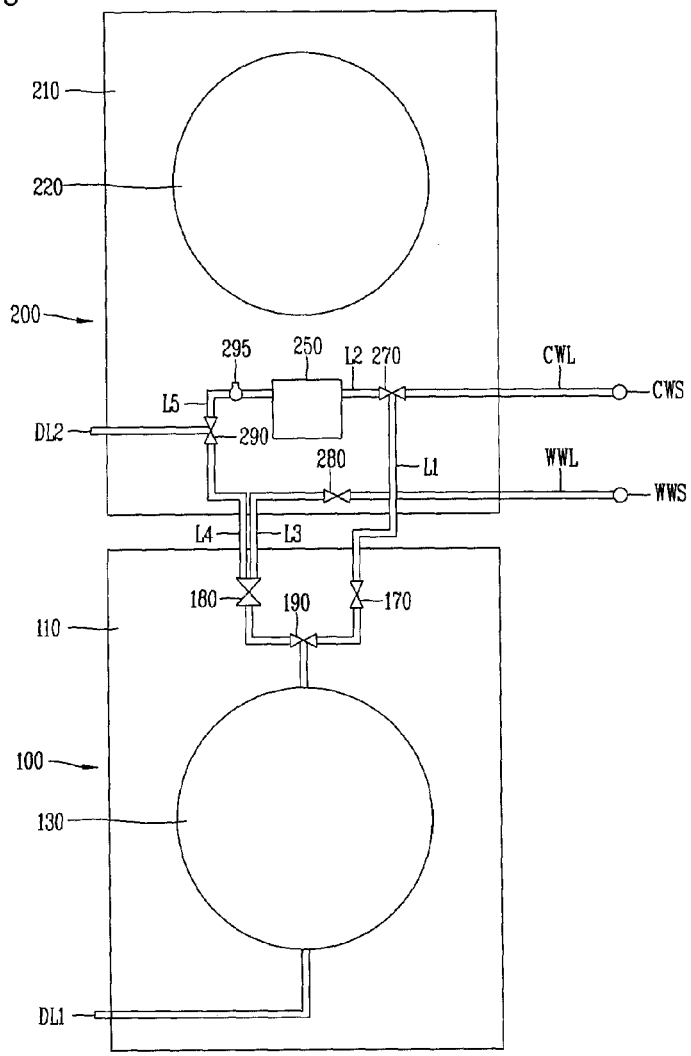
FIG. 3 is a schematic view showing water supply lines and a water supply controlling unit enabling a first main body to be connected to the second main body in the washing-drying system of FIG. 1.

FIG. 3 is a schematic view showing water supply lines allowing a connection between the first and second main bodies of the washing-drying system of FIG. 1 and a water supply controlling unit therefor.

As shown in FIG. 3, the washing-drying system in accordance with one embodiment of the present invention includes water supply lines formed in the first main body 100 and the second main body 200 or therebetween and a water supply controlling unit for controlling an opened/closed state or connected/disconnected state of the water supply lines.

Here, the water supply controlling unit includes a second controller formed in the second main body 200 for allowing a selective connection between the first main body 100 and an external water supply source (e.g., Cold Water Source (CWS)

or Warm Water Source (WWS)), and a first controller formed in the first main body 100 and cooperating with the second controller.

In more detail, the second controller includes a third valve 270 for controlling the flow of cold water supplied from the CWS of the external water supply sources (i.e., the CWS and the WWS) into the heat exchanger 250 which is disposed in the second main body 200 to eliminating moisture from laundry, a fourth valve 280 for controlling the flow of warm water supplied from the WWS of the CWS and the WWS into the first main body 100, and a fifth valve 290 for allowing cooling water discharged from the heat exchanger 250 to flow either toward the exterior or into the first main body 100.

The first controller includes a first valve 170 for controlling the flow of cold water supplied from the CWS via the second main body 200, and a second valve 180 for selectively supplying into the first main body 100 either the cooling water supplied via the fifth valve 290 or the warm water supplied via the fourth valve 280.

Here, the water supply lines are formed among the water supply sources CWS and WWS, the second main body 200 and the first main body 100. The opening and closing of the water supply lines depend on the controlling unit, namely, such valves.

On the other hand, when power is applied to the second main body 200, every valve 270, 280 and 290 installed in the second main body 200 can be controlled. When power is applied to the third valve 270 according to a microprocessor (not shown) signal at the time when the second main body 200 starts its drying process, the third valve 290 is opened.

The water supply lines include a cold water supply line CWL connecting the cold water source (CWS) to the heat exchanger 250, a washing side cold water feeding line L1 diverging from the cold water line CWL to be connected to the first main body 100, a warm water supply line WWL connecting the warm water source WWS to the first main body 100, a cooling water line L5 connecting the heat exchanger 250 to the first main body 100, a drying side drain line DL2 diverging from the cooling water line L5 to be connected to the outside of the second main body 200, and a washing side drain line DL1 connected to the outside of the first main body 100. Here, the drying side drain line DL2 may be connected to the first main body 100 via the second main body 200 to be then connected to the outside.

Describing such water supply lines in more detail, cold water supplied from the CWS to the heat exchanger 250 of the second main body 200 is supplied to the heat exchanger 250 sequentially via the cold water supply line CWL for connecting the CWS to the third valve 270 and a drying side cold water feeding line L2 for connecting the third valve 270 to the heat exchanger 250. Here, as well as being directly connected to the second main body 200, the cold water supply line CWL may be configured to be directly connected to the first main body 100 and diverge from the first main body 100 so as to supply cold water to the heat exchanger 250 of the second main body 200.

Here, a washing side cold water feeding line L1 for allowing the connection between the third valve 270 and the first valve 170 is formed to supply cold water into the first main body 100. That is, the washing side cold water feeding line L1 diverges from the third valve 270 toward the first main body 100. Here, it is important where the washing side cold water feeding line L1 diverges. Preferably, the washing side cold water feeding line L1 diverges from the CWL. This is because if the washing side cold water feeding line L1 diverges from the drying side cold water supply line L2, a selective cold water supply into the first main body 100 or the second main body 200 by means of the third valve 270 is impossible.

In the meantime, warm water supplied from the WWS into the first main body is supplied into the first may body sequentially via the WWL for connecting the WWS to the fourth valve 280 and the washing side warm water feeding line L3 for connecting the fourth valve 280 to the second valve 180.

Here, it is characterized that such warm water supplied from the WWS is supplied into the first main body 100 via the second main body 200 even if it is not used in the second main body 200. That is, the fourth valve 280 for controlling warm water supplied into the first main body 100 is characteristically is formed in the second main body 200. This is intended to supply warm water into the first main body 100 by opening or closing the fourth valve 280 in cooperation with whether the second main body 200 operates.

In other words, when the second main body 200 operates, in some cases, warm cooling water discharged out of the heat exchanger 250 can be supplied into the first main body 100, which allows the warm water washing without warm water supplied from the WWS into the first main body 100. For those cases, it is effective to install the fourth valve 280 in the second main body 200. However, in other cases, the WWL may directly be connected to the first main body 100. That is, the WWL may selectively be connected directly to the first main body 100 or to the second main body 200.

The fourth valve 280 is characteristically closed when power is supplied thereto. Thus, when the second main body 200 is powered off, the fourth valve 280 is opened, while being controlled by a microprocessor (not shown) when the second main body 200 is powered on.

Hereinafter, description will be given of water supply lines for supplying cooling water generated in the heat exchanger 250 of the second main body 200 to the first main body 100 or controlling such cooling water from being supplied into the first main body, and the controlling unit therefor.

Wastewater, namely, cooling water generated in the heat exchanger 250 while the second main body 200 performs drying, flows along the cooling water line L5 which connects the heat exchanger 250 to the fifth valve 290. The cooling water having reached the fifth valve 290 via the cooling water line L5 is either drained to the outside or supplied into the first main body 100 by the operation of the fifth valve 290. That is, to the fifth valve 290 are further connected the drying side drain line DL2, and a cooling water feeding line L4 connected to the second valve 180 of the first main body 100.

Here, whether to supply cooling water to the drying side drain line DL2 or to the second valve 180 of the first main body 100 is determined depending on the temperature of cooing water. That is, if the temperature of cooling water is higher than 40° C., the cooling water is appropriate to be used for warm water washing. Accordingly, the fifth valve 290 is operated so as to supply the cooling water to the second valve 180. If the temperature of cooling water is not higher than 40° C., the cooling water is not appropriate to be used for warm water washing. Accordingly, the fifth valve 290 is operated such that the cooling water can be drained out through the drying side drain line DL2.

A temperature sensing unit 295 for sensing the temperature of cooling water is installed at an outlet side of the heat exchanger 250. The fifth valve 290 is operated such that cooling water can be supplied into the first main body 100 when the temperature of cooling water sensed by the temperature sensing unit 295 is higher than a reference temperature (e.g., 40° C.). Here, the temperature sensing unit 295 may be implemented as thermostat, thermistor, bimetal, or the like.

After the second main body 200 operates, the fifth valve 290 is opened after a certain time elapses so as to enable the supply of cooling water into the first main body 100. In this case, the temperature sensing unit 295 is preferably set to operate for a particular time.

Here, the third valve 270 or the fifth valve 290 is switched on or switched off in cooperation of the switch-on or switch-off of the second main body 200. The fourth valve 280 is switched off or switched on in cooperation with the switch-on or switch-off of the second main body 200. Thus, the fifth valve 290 operates opposite to the fourth valve 280. That is, when the second main body 200 is turned on, the fifth valve 290 is turned on as well while the fourth valve is turned off.

If it is desired to use only the second main body 200, individually, regardless of the first main body 100, an output end of the fifth valve 290 is blocked using a stopper for use.

On the other hand, a water temperature adjusting valve 190 for allowing the connection between the first valve 170 and the second valve 180 is further provided to enable various settings for water temperature supplied into the first main body 100. Regarding unexplained reference numerals in the drawing, 110 denotes a first casing, 130 denotes a first drum, 210 denotes a second casing, 220 denotes a second drum, and DL1 denotes a washing side drain line. Here, the washing side drain line DL1 may be provided with a drain pump (not shown).

Figure 4:
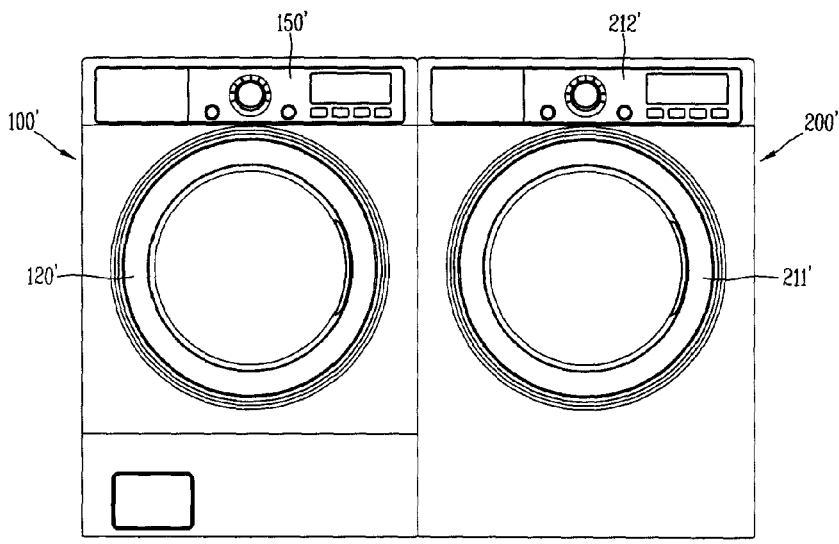
FIG. 4 is a perspective view showing a washing-drying system in accordance with another embodiment of the present invention.

FIG. 4 is a perspective view showing a washing-drying system in accordance with another embodiment of the present invention, for which a first main body 100' and a second main body 200' are disposed horizontally (i.e., right and left) other than vertically (i.e., up and down). In this case, it is disadvantageous, as compared with the one embodiment, in that the water supply lines allowing the connection between the first main body 100' and the second main body 200' become longer. This is because the connection portion of the water supply line of the first main body 100' is located at its upper side but the connection portion of the water supply line of the second main body 200' is located at a lower side. Such washing-drying system may preferably be adapted in case where there is the spatial limitation that the washing-drying system cannot be disposed up and down.

In FIG. 4, unexplained reference numeral 120' denotes a first door, 150' denotes a first control panel, 211' denotes a second door, and 212' denotes a second control panel.

Hereinafter, a method of operating a washing-drying system or a method for controlling water supply therefor according to the present invention will be described with reference to FIG. 5.

Figures 5, 6:
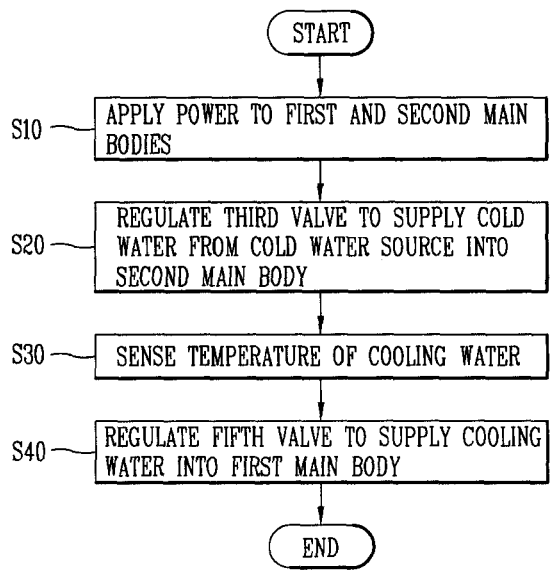
FIG. 5 is a table showing open/closed states of valves according to operation modes in a washing-drying system according to the present invention.
FIG. 6 is a flowchart showing a method for controlling water supply in case of performing warm water washing using a washing-drying system according to the present invention.

FIG. 5 shows various open and closed states according to operation modes of a washing-drying system according to the present invention.

As sown in FIG. 5, description is given of the open and closed states of those valves 170, 180, 270, 280 and 290 according to whether the first main body 100 and the second main body 200 operate, or according to their operation modes.

When the second main body 200 is powered on, the valves 270, 280 and 290 all in the second main body 200 can be controlled. Hence, at the time when the drying operation of the second main body 200 begins in earnest, power is supplied to the third valve according to a signal of microprocessor (not shown) so as to be opened. Accordingly, cold water is supplied to the heat exchanger 250 via the third valve 270 directly connected to the cold water line (CWL), so as to allow the drying or dehumidification.

The fourth valve 280 is characteristically closed when power is applied thereto. Accordingly, when the second main body 200 is turned off, it is in an open state. When the second main body 200 is in an on state, it is under the control of a microprocessor. Hence, in case of using only the first main body 100 without using the second main body 200, the fourth valve 280 is open, resulting in the warm water line WWL of the first main body 100 being connected to the first valve 170, thereby enabling warm water washing.

The fifth valve 290 is characteristically closed when power is not applied thereto. Accordingly, while the second main body 200 operates, the fifth valve 290 is controlled by the microprocessor based upon a sensed value by the temperature sensing unit 295 during the warm water washing, such that an end of the heat exchanger 252 can be opened, thereby allowing recycling of warm water for the washing operation. Hence, water can be saved and simultaneously warm water does not have to be supplied from the WWL, resulting in an energy saving effect.

Here, several operations required can be performed in cooperation with the operation of the fourth valve 280 which operates opposite to the fifth valve 290.

First, in case of a washing mode only using the first main body 100 in the washing-drying system (i.e., in case of not using the second main body 200), power is not applied to the second main body 200, whereby the third valve 270 remains closed. Accordingly, the fifth valve 290 having the same characteristic also remains closed. However, the fourth valve 280 having an opposite characteristic to them becomes open.

For performing cold water washing only using the first main body 100, the first valve 170 of the first main body 100 is open, and accordingly cold water supplied from the CWS via the CWL is directly supplied into the first main body 100 without flowing into the heat exchanger 250 of the second main body 200.

In addition, for performing warm water washing only using the first main body 100, the first valve 170 of the first main body 100 is closed and the second valve 180 is open, so as to enable the warm water washing as the same as using the first main body 100 individually.

Second, in case of a drying mode only using the second main body 200 without using the first main body 100 in the washing-drying system, the third valve is opened by the microprocessor. The temperature sensing unit 295 then senses the temperature of cooling water drained out of the heat exchanger 250. If the sensed temperature is higher than a certain temperature, the fifth valve 290 is regulated to supply cooling water into the first main body 100. However, since the first main body 100 is in a power-off state and accordingly the second valve 180 is not open, the cooling water is drained out through the drying side drain line DL2.

Third, in case where both the first and second bodies 100 and 200 operate, since the second main body 200 is in an on state, the third valve 270 is open. Accordingly, after a certain time elapses, cooling water having temperature higher than a certain temperature is drained toward an outlet side of the heat exchanger 250. As a result, the fourth valve 280 is open while the fifth valve 290 operating opposite to the fourth valve 280 is closed, or vice versa.

That is, when the first and second bodies 100 and 200 are all used and warm water washing is performed in the first main body 100, the fourth valve 280 is open and the fifth valve 290 is closed at the beginning of the operation of the second main body 200, thereby blocking cooling water, which is not warm enough to be used for the warm water washing, from being introduced into the first main body 100. However, after a certain time elapses, when the temperature of the cooling water becomes higher than a certain temperature to thusly be appropriate for the warm water washing, the fourth valve 280 is closed so as to block the supply of warm water from the WWS into the first main body 100, and the fifth valve 290 is open so as to supply cooling water into the first main body 100. Hence, water saving effect and energy saving effect can be achieved upon the warm water washing.

On the other hand, both the cold water washing and the warm water washing can be implemented by the combination of the operations of the valves shown in FIG. 5.

Fourth, in case of an operation mode in which any of the first and second bodies 100 and 200 are not turned on, most of the valves are closed, resulting in a prevention of water leakage.

Fifth, for desirably using only the second main body 200 individually, regardless of the first main body 100, a stopper may be mounted at the outlet side of the fifth valve 290, and the connection of the WWL is not needed such that the fourth valve 280 does not have to be used.

FIG. 6 is a flowchart showing a method for controlling water supply in case of performing warm water washing using a washing-drying system according to the present invention.

As shown in FIG. 6, a method for controlling water supply in case of performing warm water washing of the first main body 100 under the state that the first main body 100 and the second main body 200 all operate in the washing-drying system according to the present invention may include applying power both to the first and second bodies 100 and 200 (S10), regulating the third valve 270 to supply cold water from the CWS into the heat exchanger 250 of the second main body 200 (S20), sensing the temperature of cooling water generated when the cold water flows through the heat exchanger 250 (S30), and regulating the fifth valve 290 to supply the cooling water into the first main body 100 when the temperature of the cooling water sensed at the step S30 is higher than a reference temperature (S40).

Here, the first or fourth valve 170 or 280 is in a closed state.

The step S40 of supplying the cooling water into the first main body 100 is performed after a certain time elapses subsequent to the second main body 200 being operated. Before the certain time elapses, the fourth valve 280 is open so as to supply warm water from the WWS directly into the first main body 100.

The step S40 of supplying the cooling water into the first main body 100 may also be achieved in a manner of supplying into the first main body 100 either cooling water drained out of the second main body 200 or warm water flown through the second main body 200, depending on the temperature of the cooling water drained out of the second main body 200.

In addition, the present invention provides a washing-drying system having the first main body 100 performing washing and a second main body 200 performing drying, whereby warm water or cold water supplied from the WWS or CWS existing outside the system can be supplied into the first may body 100 after flowing through the second main body 200.

Here, cold water supplied into the first main body 100 diverges from the CWL through which the cold water is supplied from the CWS into the second main body 200, thus to be supplied into the first main body 100.

In addition, warm water supplied into the first main body 100 may be either cooling water drained out of the second main body 200 or warm water flown through the second main body 200, or may be selected, depending on the temperature of cooling water, from the cooling water drained out of the second main body 200 or warm water supplied flown through the second main body 200 to be supplied into the first main body 100.

As mentioned above, the first main body 100 included in the washing-drying system for performing washing may be a top load type washing machine (i.e., a washing machine having an inner tube rotating centering around a perpendicular rotation shaft) as well as a front load type washing machine (i.e., a washing machine having a drum rotating centering around a horizontal rotation shaft).

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A washing-drying system comprising:
a first main body including a first drum rotatably installed therein and configured to perform washing;
a second main body installed at one side of the first main body and configured to perform drying;
a second drum rotatably installed in the second main body;
a heat exchanger installed in the second main body and configured to transfer heat of hot and humid air exhausted out of the second drum to cold water supplied from a cold water source, such that the heat exchanger dehumidifies moisture contained in the hot and humid air;
water supply lines communicating with both the first and second main bodies; and
a water supply controlling unit configured to control an open or closed state or a connected or disconnected state of the water supply lines,
wherein the water supply lines include a cooling water line configured to connect the outlet of the heat exchanger to the first drum,
wherein the water supply controlling unit includes:
a second controller disposed in the second main body and configured to supply cooling water discharged out of the heat exchanger through the cooling water line into the first main body to be used for performing warm water washing or to drain the cooling water through a drying side drain line to the outside of the second main body, depending on the temperature of the cooling water; and
a first controller disposed in the first main body and operating in cooperation with the second controller,
wherein the first controller comprises:
a first valve configured to control the flow of the cold water supplied from the cold water source into the first main body via the second main body; and
a second valve configured to selectively supply into the first main body either the cooling water discharged out of the heat exchanger or warm water supplied from a warm water source, and wherein the second controller comprises a third valve configured to control the flow of the cold water supplied from the cold water source selectively to the heat exchanger or to the first valve.

2. The system of claim 1, wherein the second controller comprises:
   a fourth valve configured to control the flow of the warm water supplied from the warm water source into the first main body; and
   a fifth valve configured to drain the cooling water discharged out of the heat exchanger to the exterior of the second main body or supply the cooling water into the first main body.

3. The system of claim 2, wherein the third valve or the fifth valve is switched on/off in cooperation with an on/off switch of the second main body.

4. The system of claim 3, wherein the fourth valve is switched off/on in cooperation with the on/off switch of the second main body.

5. The system of claim 2, wherein the second main body is provided with a temperature sensing unit configured to measure the temperature of the cooling water discharged out of the heat exchanger.

6. The system of claim 5, wherein the fifth valve operates to supply the cooling water discharged out of the heat exchanger into the first main body when the temperature of the cooling water measured by the temperature sensing unit is higher than a reference temperature.

7. The system of claim 2, wherein the water supply lines comprise:
   a cold water line configured to connect the cold water source to the heat exchanger;
   a washing side cold water line diverging from the cold water line to be connected to the first main body;
   a warm water line configured to connect the warm water source to the first main body; and
   a washing side drain line connected to the outside of the first main body.

8. The system of claim 2, wherein the first main body performs warm water washing using the cooling water discharged out of the second main body.

9. The system of claim 8, wherein the second main body includes:
   a casing;
   a hot air supplying unit configured to supply hot air into the second drum; and
   an exhaust unit configured to exhaust air passed through the heat exchanger to the casing.

10. A method for controlling water supply in the washing-drying system according to claim 5, the method comprising:
    supplying power both to the first main body and the second main body;
    regulating the third valve to supply cold water supplied from the cold water source into the heat exchanger in the second main body;
    sensing the temperature of cooling water generated when the cold water flows through the heat exchanger; and
    regulating the fifth valve to supply the cooling water into the first main body when the temperature of the cooling water sensed by the temperature sensing unit is higher than a reference temperature.

11. The method of claim 10, wherein the supplying of the cooling water into the first main body is performed after a certain time subsequent to the second main body being operated, and
    wherein before the certain time elapses, the fourth valve is open so as to supply warm water from the warm water source into the first main body.

12. The method of claim 10, wherein the supplying the cooling water into the first main body is performed so as to supply into the first main body either the cooling water discharged out of the second main body or warm water flown through the second main body, depending on the temperature of the cooling water discharged out of the second main body.

13. A washing-drying system having a first mam body for performing washing and a second main body for performing drying, wherein warm water and cold water respectively supplied from a warm water source and a cold water source are supplied into the first main body through the second main body,
    wherein the second main body includes:
    a heat exchanger installed in the second main body and configured to transfer heat of hot humid air to the cold water, such that the heat exchanger dehumidifies moisture contained in the hot and humid air; and
    a temperature sensing unit installed at an outlet side of the heat exchanger, and
    wherein cooling water discharged out of the heat exchanger is supplied from the heat exchanger to the first main body through a cooling water line configured to connect the heat exchanger to the first main body, such that the cooling water is used for performing warm washing in the first main body, when the temperature of the cooling water discharged out of the heat exchanger sensed by the temperature sensing unit is higher than a reference temperature;
    wherein the flow of the cold water supplied from the cold water source via the second main body is controlled by a first valve,
    wherein either the cooling water discharged out of the heat exchanger or the warm water supplied from the warm water source is selectively supplied into the first main body by a second valve, and
    wherein the flow of the cold water supplied from the cold water source is selectively controlled to flow to the heat exchanger or to the first valve by a third valve.

14. The system of claim 13, wherein the cold water supplied into the first main body diverges from a cold water line for supplying cold water from the cold water source into the second main body, thus to be supplied into the first main body.

15. The system of claim 13, wherein water supplied into the first main body is selected, depending on the temperature of the cooling water sensed by the temperature sensing unit, between the cooling water discharged out of the heat exchanger and the warm water supplied from the warm water source.

* * * * *